Patented Mar. 3, 1953

2,630,419

UNITED STATES PATENT OFFICE 2,630,419

POLYESTER RESINS MODIFIED WITH COMPLEX METAL-PHENOL-NITROGEN COMPOUNDS

Harold F. Wakefield, Bloomfield, Sidney J. Schultz, Cranford, and Stanley H. Richardson, Millington, N. J., assignors, by mesne assignments, to Union Carbide and Carbon Corporation, a corporation of New York No Drawing. Application September 10, 1949, Serial No. 115,112

15 Claims. (Cl. 260—44)

1

This invention relates to novel phenol-soluble metallo-organic complex compounds consisting of a drier metal compound, a phenol and certain nitrogen compounds, and the invention also includes certain heat-convertible polyester resin compositions incorporating said complex compounds, such compositions exhibiting improved flexibility, toughness, adhesion and cohesion when subjected to elevated temperatures. More particularly the invention is concerned with the problem of minimizing the rheological property known as "hot-shortness" exhibited by unmodified heat-converted polyester resins when heated either in a strained condition or while subjected to stresses.

Heat-convertible polyester resins as herein defined are the initial fusible and soluble resins obtained by reacting together under esterifying conditions dihydric aliphatic alcohols and dicarboxylic unsaturated acids or their anhydrides. Illustrative of the dihydric alcohols used in making polyester resins are the various alkylene and polyalkylene glycols, such as ethylene glycol, diethylene glycol, propylene glycol, polypropylene glycol, 1,5-pentanediol, 1,10-decanediol and the like. The unsaturated dicarboxylic acids or their anhydrides include among others maleic, fumaric and citraconic, or their Diels-Alder addition products or adducts with diolefins, such as isoprene, butadiene, and cyclopentadiene.

The initial fusible resins resulting from the esterification of such dihydric alcohols and unsaturated acids or adducts consist of long linear chain molecules, and these by cross-linking reactions, presumably through the unsaturated carbon to carbon bonds of the acidic residue and promoted by heat, oxygen, sulphur, or by the presence of another unsaturated organic compound such as a vinyl monomer or a conjugated double bond drying oil, yield infusible and relatively insoluble polymers.

The infusible polymers obtained essentially by heating or by heating in the presence of atmospheric oxygen exhibit as coatings, good flexibility, tensile strength, elasticity and cohesiveness at room or elevated temperatures (particularly the polyester resins prepared from the cyclopentadiene adduct of maleic anhydride which are not unduly affected even after prolonged exposures of four to eight months at elevated temperatures between 80° C. and 120° C.) provided the resins are not in a strained condition or subjected to stress while exposed to heat. When the polyester resins converted to the infusible state

2 are in a strained condition or subjected to stress while exposed to elevated temperatures, they tend to soften, rupture, crack, and lose adhesion to metal surfaces, the severity of such injuries depending upon the temperature and degree of stress or strain. The softening is not directly akin to the plastic and elastic flow of truly thermoplastic resins when similarly treated, since the converted polyester resins retain their infusible gel structure even when heated to decomposition temperatures; rather the apparent softening is due primarily to a progressive decrease in the elastic limit of the polyester gels as they are heated, and correspondingly decreasing stress loads but in excess of the elastic limit at any given temperature, cause deformation by rupture and not by plastic or elastic flow.

A rheological behavior of this type is also known as "hot-shortness," which has been defined as that condition which occurs when a material loses ductility or malleability at high temperatures so that it cannot be hot-worked. This state may be produced in a metal alloy when one of its components becomes liquefied while the other remains as a solid, and it may also be produced in cross-linked polymers such as rubber and heat-converted phenol-aldehyde resins.

The defect of "hot-shortness" has limited the use of polyester resins for coatings despite their otherwise excellent properties for such uses. Particularly in the field of electrical insulating wire enamels it is of present day importance that such coatings have flexibility, coherence and adhesion not only at room temperature but also at the elevated operating temperatures of electrical apparatus, such as motors, coils, relays, transformers and the like in which the coated wire is used. When unmodified polyester resins have been tried as coatings for such uses, it has been found that at elevated temperatures the heat-converted resins tend to crack and/or flake off the wire if the coatings are in a strained condition or subjected to stress.

To a minor extent the incorporation of siccatives or driers such as the polyvalent metal resinates, linoleates and naphthenates in the polyester resins before heat-conversion, improves the resins with regard to retention of flexibility, hardness and elongation at elevated temperatures. Such driers are manufactured by reacting the oxides, hydroxides or salts of polyvalent metals with various organic acids or glycerides to form the metallic soaps or salts of the acids. The polyvalent metals found must useful economically in this connection include lead, manganese, cobalt, zinc, iron and vanadium; however, many other metals such as cadmium, nickel, cerium, thorium, titanium, etc., also have a recognized catalytic effect on paints and varnishes based upon fatty drying and semi-drying oils.

It has now been found that improvements in the properties of polyester resins of a much greater order of magnitude, especially with respect to reduction of the "hot-shortness" characteristic of the unmodified heat-converted polyester resins are obtained by incorporation in the resins while in the fusible state of a phenol-soluble complex reaction product resulting from the co-reaction of an oxide, hydroxide or salt of a polyvalent drier type metal, a phenol and certain nitrogen compounds.

It has been further found that additional improvements with respect to heat-resistance in the thus-modified polyester resins are obtainable by the addition thereto of an oil-soluble phenol-aldehyde resin particularly those resins of this type which are "heat-reactive"; by the term "oil-soluble" is meant those resins soluble in fatty oils of the drying, semi-drying and non-drying types, and by "heat-reactive" it is intended to define resins that, alone or when mixed with blown fatty oils and then sufficiently heated, yield infusible products. All such phenol-aldehyde resins are compatible with polyester resins of this invention and remain in solid solution upon heat-conversion of the mixture.

Although complex addition or co-ordination compounds of the oxides, hydroxides or salts of polyvalent drier type metals with ammonia or its organic derivatives, such as amides, mono- and polyamines, and oximes, have been previously described in the literature, such compounds have not found application for the purposes of the present invention because of their general insolubility in fusible polyester resins or their solutions in aromatic hydrocarbon solvents, such as toluol, xylol, phenol, cresol and the like. But it has now been found that by conducting the reaction of the metal compound and a suitable nitrogen compound containing one or more nitrogen atoms having replaceable hydrogen attached thereto, in the presence of a phenol, which apparently also reacts therewith, complex reaction products in the form of clear viscous liquids to resinous solids are produced, which are not only compatible with the fusible polyester resins and oil-soluble phenol-aldehyde resins, but furthermore remain in solid solution upon heat-conversion of the resins. The complex reaction products are furthermore soluble in aromatic hydrocarbon solvents, including benzene, toluene, xylene, phenol, cresol and mixtures thereof known as wire enamel solvents.

The quantity of metallic compound entering into addition-reactions to form phenol-soluble clear viscous complexes, as through co-ordinate valence bonds or hydrogen-bonding with the nitrogen compounds and the phenol, varies somewhat with the different metals and their individual compounds and also with the particular nitrogen compound and phenol; accordingly clear viscous complexes may contain as little as 1% and as high as 47% by weight of the original metal compound. In general, oximes, monoalkyl primary amines, secondary and tertiary amines in conjunction with a phenol yield clear liquid complexes containing only a small percentage of the original metal compound; but ammonia, ammonium hydroxide and saturated aliphatic nitrogen compounds having more than one $NH_2$ group such as urea and the alkylene polyamines, particularly ethylene diamine, propylene diamine, diethylene triamine, 1,2,3-triaminopropane, and to a lesser extent the higher molecular weight polyamines, such as triethylene tetramine and tetraethylene pentamine, all favor formation of phenol-soluble complex compounds in liquid to solid consistencies containing larger amounts of the original reactant metal compound.

The phenols having utility in forming phenol-soluble clear homogeneous complexes include phenol, its simple homologues, such as the cresols and xylenols; the alkyl-substituted phenols, such as ethyl, butyl, amyl, and octyl phenols; carboxy phenols such as the hydroxy benzoic acids including salicylic acid and the cresotic acids; halo phenols, for example 2,4-dichlorophenol, p-chloro phenol and 2,4 dibromo phenol; polycyclic phenols such as the naphthols and the phenyl phenols and polyhydroxy phenols such as diphenylolpropane, hydroquinone, resorcinol, and pyrogallol. The lower molecular weight monohydroxy phenols, such as phenol, cresol, butyl phenols and the like are preferred because they promote the incorporation of larger amounts of the original reactant metal compound into the resultant complex.

The polyvalent drier metals entering into such addition reactions include those drier type metals having a principal valency of two, such as zinc, cadmium and lead, which enter most readily into addition or co-ordination compound reactions with the nitrogen compounds and phenols. Compounds of metals having a minor valency of two, or only valencies higher than two, for instance, iron, aluminum, and chromium, also yield complexes but occasionally with some precipitation of phenol insoluble matter or with negligible amounts of the metal compound in solution requiring filtration before use.

Although all the clear liquid addition compounds, consisting of the co-reaction product of a drier metal oxide, hydroxide or salt, a suitable nitrogen compound and a phenol that have thus far been incorporated in fusible polyester resins, were found to measurably improve the physical properties of the heat-converted polyester resins at elevated temperatures, the most pronounced benefits have been obtained from the addition compounds wherein the drier metal was zinc, cadmium or lead and to a lesser extent where the metal was cobalt, manganese, vanadium or nickel, and wherein the nitrogen compound is ammonia, ammonium hydroxide, urea or a saturated alkylene polyamine free from reactive groups other than amino ($NH_2$) or imino (NH).

In the preparation of the complexes, the amount of phenol and nitrogen compound required to insure production of a clear homogeneous complex is readily ascertained for any specific metal compound by heating together definite quantities of each of the ingredients to between about 60° and 250° C. for up to about two hours. The phenol and nitrogen compound in practically all instances are mutually soluble when brought to a liquid state, and the metal compound proceeds to dissolve in the phenol-nitrogen compound solution. If too much metal compound is present in relation to the other reactants, only a portion of the metal compound enters into solution, and therefore more nitrogen compound or phenol, or both are required to be added to cause reaction of the remaining unreacted or undissolved metal compound. Data thus far obtained on the production of these complexes indicate that homogeneous reaction products can usually be obtained when the phenol reactant is employed in a quantity at least approximating that providing for three or more phenolic hydroxyl groups per metal atom of the metal compound. The minimum quantity of nitrogen compound varies over a great range, although several types of nitrogen compounds have substantially equivalent minimums. For example, mono alkyl primary amines, secondary aliphatic amines or polyamines having only imino groups for instance 1,3-bis ethyl amine butane require between 10 to 32 mols thereof per metal atom of the metal compound to obtain a homogeneous complex. More effective nitrogen compounds, such as ammonium hydroxide or nitrogen compounds having a plurality of $NH_2$ groups such as urea, or the saturated alkylene polyamines free of reactive groups other than $NH_2$ or $NH$ can frequently be used in quantities as little as that supplying about 3 $NH_2$ groups per metal atom or 3 $NH_4OH$ molecules in the case of amonium hydroxide. With dry ammonia, at least about five mols per metal atom appears indicated to obtain a homogeneous, phenol-soluble complex.

Preferably the complexes are prepared with more than the aforedescribed minimum quantities of phenol and nitrogen compound to facilitate and insure rapid production of clear complexes free of insoluble matter. Upon completion of the reaction made with more than the minimum quantities of phenol and nitrogen compounds, a portion thereof can be removed by fractional distillation of the complex in vacuo at temperatures up to about 220° C. without destroying the aromatic hydrocarbon solubility of the complex remaining as a resinous residue in the still. The residue when fused with oil-soluble phenolaldehyde resins is soluble in fatty drying oils.

Water can be present during the reaction as for instance in the use of ammonium hydroxide solutions or aqueous solutions of aliphatic amines without interfering with the reaction.

Examples illustrating the technic of preparing clear, phenol soluble, complex addition compounds are as follows:

Example 1

A mixture of 5 grams cadmium oxide (CdO), 25 grams diethylene triamine and 70 grams phenol ($C_6H_5OH$) were heated to 150° C. in a one-half liter flask equipped with a reflux condenser. Upon heating for 30 minutes at this temperature and with stirring, a clear amber colored viscous liquid was obtained.

Example 2

A larger amount of cadmium oxide, namely 9.3 grams, reacted with 20.7 grams diethylene triamine and 70 grams phenol ($C_6H_5OH$) by heating and stirring, under the same conditions as Example 1, also yielded a clear amber colored liquid of higher viscosity than that of Example 1.

Example 3

A clear, syrupy liquid was obtained by heating to 150° C. as before, 47 grams zinc acetate $$Zn(C_2H_3O_2)_2 \cdot 2H_2O$$

12 grams diethylene triamine and 41 grams phenol ($C_6H_5OH$).

Example 4

A complex addition compound of magnesium in liquid form was obtained by heating together to 150° C. under reflux conditions and with agitation 5 grams of magnesium acetate $$Mg(C_2H_3O_2)_2 \cdot 4H_2O$$

25 grams diethylene triamine and 70 grams phenol ($C_6H_5OH$).

Example 5

A complex addition compound of manganese was prepared by heating as before to 150° C. under reflux conditions 10 grams manganese acetate ($Mn(C_2H_3O_2)_2 \cdot 4H_2O$), 20 grams diethylene triamine, and 70 grams phenol ($C_6H_5OH$) which yielded a clear dark amber liquid.

Example 6

A complex addition compound of nickel was prepared by heating together under reflux conditions to a temperature of 150° C., 5 grams nickel carbonate ($NiCO_3$), 25 grams diethylene triamine, and 70 grams phenol ($C_6H_5OH$), resulting in a clear viscous violet colored liquid.

Example 7

A dark red viscous liquid that was somewhat cloudy was obtained by heating together under reflux conditions to 150° C., 5 grams ferric acetate ($FeOH(C_2H_3O_2)_2$), 25 grams diethylene triamine, and 70 grams phenol ($C_6H_5OH$).

Example 8

A clear, viscous, dark red liquid was obtained by heating together to 150° C. under reflux conditions and with agitation, 17.7 grams cobaltous chloride ($CoCl_2 \cdot 6H_2O$), 20.3 grams diethylene triamine, and 62.0 grams phenol ($C_6H_5OH$).

Example 9

Another complex compound of cobalt was prepared by heating together to 150° C. under reflux conditions and with agitation 17.7 grams cobaltous acetate ($Co(C_2H_3O_2)_2 \cdot 4H_2O$), 20.3 grams diethylene triamine and 62.0 grams phenol ($C_6H_5OH$).

Example 10

A clear viscous amber liquid resulted from heating to 160° C. under reflux conditions and with stirring, 184 grams lead chloride ($PbCl_2$), 100 grams diethylene triamine and 600 grams of mixed phenols derived from coal tar consisting of 5–10% phenol, 30–40% meta cresol, 21–27% para cresol, 16–22% ortho cresol, and up to 12% of mixed xylenols and neutral tar oils.

Example 11

A complex compound in liquid solution prepared from lead oxide (PbO) was made by heating to 150° C. for 30 minutes under reflux conditions and with stirring, 210 grams of the lead oxide, 110 grams of diethylenetriamine, and 680 grams of mixed phenols as described in Example 10. The clear solution contained a slight amount of filterable white precipitate of unidentified material.

Example 12

Reducing the quantity of lead oxide (PbO) in the preparation of another liquid complex, also yielded a clear liquid having a slight amount of white precipitate. Thus, 146 grams of the lead oxide were heated to 150° C. under reflux conditions and with stirring for 30 minutes, in admixture with 100 grams diethylenetriamine and 600 grams of the same mixed phenols as in Example 10, resulting in the formation of a clear, dark amber liquid.

Example 13

A clear complex addition compound of zinc oxide in liquid form was prepared by heating together for 70 minutes at 138°–145° C. under refluxing conditions and with stirring, 48 grams finely divided zinc oxide (such as a zinc oxide prepared by combustion of metallic zinc), 504.0 grams of the mixed phenols described in Example 10, and 84 grams of ethylenediamine (70% aqueous solution). The resultant clear liquid complex had a viscosity of T+ on the Gardner-Holdt scale, a color of 9+ (Hellige standard), and a non-volatile content of 35-37% when heated as a thin film for 3 hours at 135° C. Substitution of the same amount of ethylenediamine in anhydrous form for the aqueous ethylenediamine resulted in a complex having a higher Gardner-Holdt viscosity, namely, Z–1, but a similar non-volatile content of 35.6%.

Example 14

A zinc oxide complex using urea as the solubilizing nitrogen compound was prepared by heating for two hours to 200° C., 120 grams zinc oxide, 255 grams urea and 1125 grams of the mixed phenols described in Example 10 in a flask equipped with an air cooled reflux condenser. A 91% yield of a clear light amber colored liquid was obtained having a viscosity of H on the Gardner-Holdt scale, a specific gravity of 1.153, and a non-volatile content of 28% when heated as a thin film for 3 hours at 135° C.

Example 15

Monoamines such as butyl amine are less effective solubilizing nitrogen compounds than the nitrogen compounds having a plurality of $NH_2$ groups, but clear complexes are nevertheless obtainable with restricted quantities of the metal compound. Thus by stirring and heating together to 150° C. for 10 minutes and then permitting to cool overnight, a clear amber colored liquid was obtained from 175 grams phenol, 2.5 grams finely divided zinc oxide and 72.5 grams butyl amine. In further experiments with various aliphatic primary monoamines in reaction systems consisting of 1 gram zinc oxide prepared by combustion of zinc metal, 29 grams of amine and 70 grams phenol ($C_6H_5OH$) with the reaction mixture being heated in a glass flask fitted with a thermometer, reflux condenser and agitator, the following data were secured:

Clear solutions were obtained after 25 to 36 minutes prolonged heating at temperatures between 130° and 160° C. with allyl amine, isopropyl amine, N-hexylamine, 2-ethylhexylamine, octyl amine, and N-decyl amine. Dodecyl amine required about 20 minutes at temperatures between 177° and 186° C. to yield a clear solution containing a very slight precipitate. A 1 gram quantity of mono ethyl amine solution (70% aqueous solution) gave a clear solution of the zinc oxide in a few seconds at 100° C. Octadecyl amine after 30 minutes at 175 to 187° C. only partially dissolved the zinc oxide.

Example 16

A clear liquid complex was obtained by heating under reflux for 30 minutes at 150° C., 175 grams a-naphthol, 62.5 grams diethylene-triamine and 12.5 grams finely divided zinc oxide.

Example 17

A clear liquid complex was obtained with meta-xylenol, by heating together 175 grams meta-xylenol, 12.5 grams finely divided zinc oxide (French process) and 57.5 grams diethylenetriamine. Clarity of the dispersion resulted before gaining 150° C.

Example 18

A clear liquid complex was obtained with tertiary butyl phenol by heating under reflux conditions at 150° C., 175 grams of tertiary butyl phenol, 62.5 grams diethylenetriamine and 12.5 grams finely divided zinc oxide, the dispersion clarifying to a clear liquid after 10 minutes heating at 150° C.

Example 19

Seven hundred (700) grams p-phenyl phenol, 60 grams finely divided zinc oxide and 250 grams diethylenetriamine were heated together for 30 minutes at 150° C. resulting in the mixture clarifying to a clear amber colored liquid.

Example 20

A zinc oxide clear liquid complex was prepared by dispersing 48 grams finely divided zinc oxide in 504 grams of mixed phenols as described in Example 10, and then with agitation 84 grams of diethylenetriamine were added thereto causing a controllable exothermic reaction, the temperature increasing to 85° C. The mixture was then heated to 140° C. and held there for 30 minutes resulting in a clear solution having a viscosity of Z–6+ Gardner-Holdt, a specific gravity of 1.012 and a non-volatile content of 39.5% when heated as a thin film for 3 hours at 135° C. The non-volatile residue could be redissolved in phenols, cresols and similar aromatic compounds.

Example 21

A liquid complex having a higher content of zinc oxide in solution was prepared by heating together in a glass flask equipped with an air-cooled reflux condenser 2228 grams of phenol ($C_6H_5OH$), 648 grams finely divided zinc oxide, and 1124 grams diethylenetriamine to a temperature of 250° C. within 4 hours while permitting volatile products to escape from a reflux condenser maintained at 100° C. A clear liquid while hot was obtained in 94% yield and upon cooling the liquid congealed to a dark, sticky but yet brittle, resinous material soluble in aromatic hydrocarbon solvents.

Example 22

A viscous liquid complex prepared from a phenol monocarboxylic acid was produced by heating together 79.2 grams salicylic acid, 7.6 grams zinc oxide and 13.2 grams diethylenetriamine for 45 minutes at 171° C. When cooled to room temperature the resultant clear liquid had a light amber color and a phenolic odor and was so highly viscous that it could be held inverted for several minutes before noticeable flow occurred.

Example 23

A clear complex compound of zinc chromate ($ZnCrO_4$) was made by heating for one hour at 140° C. in a flask, a mixture consisting of 15.4 grams zinc chromate, 12.1 grams diethylene triamine and 72.5 grams of the mixed cresol-phenol mixture described in Example 10. Upon cooling the clear complex, a slight precipitate was observed. The clear complex had a viscosity of 165,000 centipoises at 25° C.

Example 24

A clear complex of zinc chloride ($ZnCl_2$) was made by heating for one hour at 140° C. in a flask, a mixture consisting of 12.1 grams zinc chloride, 12.54 grams diethylene triamine and 75.36 grams of the mixed cresol-phenol mixture described in Example 10. This complex exhibited a viscosity of 128 centipoises at 25° C.

*Example 25*

A clear complex was made from zinc sulfate by heating in a flask for one hour at 140° C. 15 grams thereof together with 75 grams diethylene-triamine, and 210 grams of the mixed cresol-phenol mixture described in Example 10. Upon cooling the clear liquid complex to room temperature it formed a gelled mass.

*Example 26*

In exemplification of nitrogen compounds wherein the nitrogen present is solely in the form of imino groups, a clear phenol-soluble complex was prepared by heating together in a flask, a mixture consisting of 70 grams phenol ($C_6H_5OH$), 1 gram zinc oxide (French process) and 29 grams 1,3-bis ethyl amine butane. The mixture became homogeneous and clear on attaining a reaction temperature of 150° C. and remained homogeneous upon cooling.

*Example 27*

Illustrative of phenol-soluble complexes prepared with ammonia as the nitrogen compound was the product prepared by charging a glass flask with 5 grams cadmium oxide (CdO) and 175 grams phenol. This mixture was heated to 67° C. and ammonia gas passed through the mixture. With the introduction of the ammonia, the temperature of the mixture gradually rose to 95° C. and then fell to 76° C. during a period of 30 minutes. At the end of this time the mixture was transparent and the flow of ammonia was discontinued. Weight determinations indicated the reaction product had absorbed 7.5 grams of ammonia.

*Example 28*

A phenol-soluble complex based on ammonia and lead oxide (PbO) was made by charging a flask with 175 grams phenol and 2.5 grams lead oxide. The mixture was heated to 65° C. and ammonia gas was then continuously introduced causing the temperature to rise at 83° C. Within 15 minutes the mixture absorbed 11.5 grams ammonia and yielded a practically clear complex.

*Example 29*

A phenol-soluble complex based on ammonia and zinc oxide was made by charging a flask equipped with an agitator reflux condenser with 405 grams phenol and 52 grams zinc oxide (French process). The contents of the flask were heated to 65° C. and then ammonia gas was bubbled through the phenol-zinc oxide mixture. No external heat was applied to the flask after initiating the flow of ammonia into the flask. The temperature rose to 72° C. upon starting the flow of ammonia, increased to 99° C. after 23 minutes, the contents of the flask then having a light purple color. The temperature then slowly decreased to 89° C. after another 23 minutes of reaction and continued flow of ammonia, at which time a clear reaction product was obtained. By weighing the flask and its contents, it was determined that 37 grams of ammonia had been absorbed by the reaction mass. The product was a clear dark blue-purple liquid having a Gardner-Holdt viscosity of K at 25° C. and specific gravity 1.172. Heating a film of the product to about 200° C. for 12 minutes by a 250 watt infra red lamp left a clear aromatic hydrocarbon soluble, resinous residue amounting to 32 per cent by weight of the original product.

*Example 30*

A complex prepared with ammonium hydroxide as the nitrogen compound resulted from mixing together 70 grams phenol, 29 grams aqueous ammonium hydroxide (28 per cent solution) and 5.35 grams zinc oxide (French process). The mixture was warmed slightly to about 50° C. forming almost immediately a clear homogeneous liquid which was soluble in phenol and toluol.

*Example 31*

A clear, amber-colored complex containing a halophenol as a reactant was made by heating to about 127° C. a mixture consisting of 87.4 grams 2,4-dichloro phenol, 4.7 grams zinc oxide (French process) and 7.9 grams diethylenetriamine. The mixture cleared on gaining 127° C. An additional 0.5 gram zinc oxide was added and went into solution, but when a second increment of 0.5 gram zinc oxide was added, the mixture became cloudy and did not become clear even after extended heating.

*Example 32*

Another clear, phenol-soluble complex from a halophenol was made by heating to 138° C. a mixture consisting of 84.53 grams para-chlorophenol, 10.0 grams zinc oxide (French process) and 13.2 grams diethylenetriamine. The mixture became clear on gaining 138° C. and remained clear on cooling. The product was soluble in phenol, toluol and similar aromatic hydrocarbons.

The polyester resins which are benefited by the incorporation of the aforedescribed complex compounds, are prepared by conventional esterification procedures, which involve heating together a mol of the dibasic unsaturated acid with at least a molar quantity of the dihydric alcohol, while removing the water formed during the esterification reaction. The extent of esterification is measured by acid number determinations of the reaction mass, and generally the reaction may be terminated when the acid number is less than 25, at which stage usually a viscous to semi-solid resinous mass is obtained. The polyester resins at this stage are at least partly soluble in aromatic hydrocarbons such as benzol, toluol, xylenol and higher boiling aromatic solvents, particularly mixtures thereof sold as wire enamel solvents, glycol ethers, phenols, mixtures of monohydric alcohols with aromatic hydrocarbons and with esters such as ethyl acetate. Acidic inorganic and organic catalysts, such as sulphuric acid or p-toluene sulphonic acid may be used to accelerate the esterification reaction. Illustrating typical preparation of polyester resins in fusible form are the following examples:

POLYESTER RESIN A

Four hundred and eighty-six (486) grams triethylene glycol and 514 grams 3,6-endomethylene - $\Delta^4$ - tetrahydrophthalic anhydride were heated together in a still to a temperature of about 210° C. and held there while distilling off water of condensation until the resultant resinous reaction product had an acid number less than 25. Carbon dioxide may be present as an inert atmosphere in the still during the course of the reaction and assists in the production of lighter colored resin and inhibits premature gelation. The resin as discharged from the still had a clear amber color and a viscosity of 2500 centipoises when diluted three parts to one part by weight of ethylene glycol monoethyl ether. Further heating of the resin in the absence of oxygen converts it into a soft, rubbery gel.

POLYESTER RESIN B

A polyester resin was prepared by heating together in a still 3065 grams maleic anhydride and 4935 grams triethylene glycol in the presence of 40 grams hydroquinone (gelation inhibitor) to a temperature of 228° C. while distilling off water of condensation until the resultant resinous reaction product had an acid number of 24.3. The discharged resin had an amber color and a viscosity of 2000 centipoises when diluted three parts to one part by weight of ethylene glycol monoethyl ether.

POLYESTER RESIN C

A polyester resin was prepared by reacting together in a still 1410 grams maleic anhydride, 2110 grams phthalic anhydride, 4480 grams triethylene glycol and 20 grams hydroquinone. The esterification reaction was accelerated by heating to 210° C. and by continuously removing water of condensation until the resultant viscous resin had an acid number of 35. The discharged resin had a viscosity of 450 centipoises when diluted three parts to one part by weight of ethylene glycol monoethyl ether.

POLYESTER RESIN D

A polyester resin was made by charging a glass flask equipped with an agitator, water trap and reflux condenser sealed with $CO_2$ with 385 grams 1,5-pentanediol, 586 grams 3,6-endomethylene-$\Delta^4$-tetrahydrophthalic anhydride and 29 grams xylol. The charge was heated to 210° C. and refluxed at this temperature while removing water of condensation until the resultant polyester had an acid number below 20 (about 5 hours). The xylol and any remaining water was then removed by distillation under vacuo at 150° C. leaving as a residue a clear viscous resin. The resin was diluted with ethylene glycol monoethyl ether in the ratio of 3 parts by weight of resin to 1 part by weight of solvent, the solution exhibiting a viscosity of 7350 centipoises, a Gardner-Holdt color of 5 and specific gravity of 1.126.

POLYESTER RESIN E

A polyester resin was made by charging a glass flask equipped as described for polyester resin D with 110 grams 1,10-decanediol, 100 grams 3,6-endomethylene-$\Delta^4$-tetrahydrophthalic anhydride and 11 grams xylol. The charge was heated under refluxing conditions to 210° C. and held at this temperature while removing water of condensation until the resultant polyester resin upon testing had an acid number below 20 (about 9 hours). Xylol and other volatile matter were then removed from the viscous resinous mass by distillation in vacuo up to 150° C.

The stabilization effect of the phenol-nitrogen-metal complexes in the polyester resins is adequately demonstrated in the applications of the resins as electrical insulating coatings for copper wire. Without the presence of the metal complex, the heat and oxygen converted coatings fail to meet the present day stringent requirements for high quality wire coatings. Thus, it is expected that when varnish coated wire is used in the construction of electric motor coils, magnets, multi-conductor cables, etc., that the coating will not fail by being abraded or cracked from the necessary mechanical manipulation of the wire in the construction of the electrical apparatus or from subsequent heating of the insulated wire during use of the electrical apparatus. Empirical tests designed to over-emphasize the mechanical and heating conditions to which the insulated wires are subjected in actual use, have been long used in testing the properties of wire coatings.

One such test, designated as "hot scrape resistance," measures the resistance to extreme abrading forces at elevated temperature. It consists in pulling the coated wire under a steel needle having a diameter of 0.0155 inch and mounted at right angles to the axis of the wire; a gradually increasing load is applied to the needle until it cuts through or tears off the wire coating; the test is additionally stringent in that it is conducted within a heated chamber maintained at 107° C.; the results are reported in the number of ounces applied load on the needle which the coating can resist before cracking, peeling or tearing.

Another test, designated as "heat shock," measures the effect of heat on a wire coating which has been strained by being subjected to conjoint tensile, compressive and flexing stresses resulting from winding the coated wire at room temperature on a constant tapered mandrel (having a length of 3.75 inches, a diameter of one-half inch at its base and a needle point at its apex) to form a spiral coil. The spiral is placed in an oven at 125° C., baked for 30 minutes and then examined for cracking and flaking off of the coating. The test is especially severe in measuring adherence, flexibility and elasticity of the coating while it is in a highly strained condition. A coating is considered highly satisfactory if only a few cracks develop on the last few turns of the apex of the spiral. Less satisfactory coatings may crack more or less over the entire length of the spiral, but totally unsatisfactory are those coatings cracking and flaking off from the wire. The latter defect is typical of unmodified polyester resins, while polyester resins modified with the phenol-soluble metal complexes described herein generally exhibit only a restricted amount of cracking unattended by any flaking off of the cracked coating.

In the following examples there are shown the improved heat-resistance of polyester resins modified by the incorporation of various phenol-soluble metal complexes as herein described, all parts being by weight.

Example 33

A wire enamel was prepared by dissolving in 12.1 parts wire enamel solvent (a commercial mixture of high-boiling aromatic hydrocarbon solvents), 4.4 parts of a heat-reactive, oil-soluble phenolic resin prepared from 10% phenol, 90% butyl phenol and formaldehyde in proportion to yield a heat-reactive resin. To this resin solution, there were added 44 parts of polyester resin A and its solution was facilitated by agitation and slight heating; then 25.5 parts of the viscous zinc oxide complex described in Example 20 were added to the mixture and dissolved by agitation. The resultant solution was further diluted with a commercial wire enamel solvent to a non-volatile content of 28% and a viscosity of 40–60 centipoises. The resin solution was applied on No. 17 copper wire by dip-coating methods, a total of four coats being applied successively and each coating being baked in a wire tower for about 40–50 seconds at temperatures between 700° F. and 750° F. Break down voltages applied to twisted pairs of the coated wire by the short-time test method (60 cycles/sec., 25° C.) varied between 1800 and 3400 volts for a coating film of average thickness of 1.0 mil. Testing the coating for "hot-scrape" resistance after exposing it for 48 hours at 125° C. required an applied force of 53 ounces on the needle to cause peeling off of the coating and in the "heat shock" test no cracking except on the three smallest turns of the spiral was observed. The coating suffered no permanent injury when immersed in boiling water for 60 minutes, or for 10 minutes in a refluxing mixture of one part ethanol and one part toluol. Immersion of the coated wire for 16 hours at 125° C. in "Pyranol No. 1467" a dielectric transformer heat exchange fluid comprising a mixture of trichlorobenzene and chlorinated diphenyl caused no injury to the coating, whereas under the same conditions a conventional oleo-resinous wire coating was softened to a degree permitting easy removal by scratching with the finger nail, and a high grade synthetic wire coating based on a mixture of thermosetting phenolaldehyde resin and a partial polyvinyl acetal resin blistered severely and separated from the wire.

In comparison to these values the same polyester resin (A) when used alone as a wire enamel, yielded baked coatings having a "hot-scrape" resistance of only 21 ounces and in the "heat shock" test, the coating cracked throughout the entire spiral, and flaked off to the extent of 50% of the shorter turns. Omitting the oil-soluble phenolic resin, for instance, in a wire coating enamel containing 63.2% of the polyester resin and 36.8% of the zinc oxide complex from Example 20 yielded baked coatings having satisfactory "heat shock" properties but somewhat low scrape resistance, e. g., 38 ounces and requiring higher baking temperatures, e. g., 765° F., to harden the coatings, which even though tack-free, did not have the slippery feel of the coatings obtained from Example 33. Furthermore, it softened and blistered when tested in boiling water and refluxing ethanol-toluene mixtures.

*Example 34*

Twelve hundred (1200) parts polyester resin B, 700 parts of the zinc oxide complex described in Example 20, and 120 parts of the same oil-soluble, heat-reactive phenolic resin as in Example 33 were mixed together forming an opaque mass, which clarified when diluted with 232 parts ethylene glycol monoethyl ether, 270 parts mixed cresols and 405 parts butanol. The clear varnish was additionally diluted with commercial wire enamel solvent to 28% non-volatile content for use in dip-type wire coating equipment. Four successive coats of the diluted varnish were applied on No. 17 gauge copper wire and each coating was baked at 680° F. for about 40–60 seconds. A hard flexible electrical insulating coating having an average film thickness of 0.8 mil was obtained on the wire. Testing the wire before heat-aging, resulted in a "hot-scrape" resistance of 55 ounces, and cracked only on the smallest turn when subjected to the "heat-shock" test. After heat-aging for 48 hours at 125° C., the scrape resistance was approximately the same, e. g., 58 ounces, and the "heat-shock" test exhibited cracking on only the smallest turns.

*Example 35*

Twelve hundred (1200) parts polyester resin C, 700 parts of the zinc oxide complex of Example 20, and 120 parts of the same heat-reactive, oil-soluble phenolic resin as before were mixed together with 616 parts commercial wire enamel solvent yielding a slightly cloudy mixture, which clarified upon the addition of 110 parts of mixed cresols. The solution was further diluted with the same wire enamel solvent to a 28% non-volatile content. Applied to No. 17 wire as in Example 34, but baked at 730° F., four coats of the varnish yielded an adherent baked film having an average thickness of 1 mil. The coating satisfactorily passed the "heat-shock" test, no cracks developing in any of the turns of the spiral, but had a somewhat lower scrape resistance, e. g., 25 ounces, than the previous coatings due to the effect of the phthalic anhydride in polyester resin C.

*Example 36*

Fifteen hundred sixty-eight parts (1568) of polyester resin A, 1182 parts of cadmium oxide complex from Example 2, 156 parts oil-soluble heat-reactive phenolic resin as before and 156 parts commercial wire enamel solvent were mixed together, resulting in a clear viscous solution, which could be further diluted with the same solvent to a wire coating viscosity of about 50 centipoises at a non-volatile content of 28%. A slight haziness of the diluted resin solution was cleared by the addition of a small quantity of mixed cresols. Applied by dip-coating to No. 17 gauge wire as in Example 34 and baked in the same manner, an adherent clear coating was obtained having an average thickness of 1 mil. The coated wire satisfactorily passed the "heat-shock" test both before and after heat-aging for 48 hours at 125° C., and exhibited a constant "hot scrape" resistance of 50–52 ounces for the aged and unaged samples. The coating satisfactorily resisted the effects of immersion for 60 minutes in boiling water, and while softened when immersed in a refluxing mixture of ethanol and toluol, recovered its hardness rapidly upon drying.

*Example 37*

Eight hundred seventy-four (874) parts of polyester resin A, 510 parts of the manganese acetate complex of Example 5 and 88 parts of the same oil-soluble, heat-reactive resin were mixed together and diluted with a commercial wire enamel solvent to 28% non-volatile content. The resultant clear varnish was applied to No. 17 gauge wire as in the previous examples and baked at 680° F. to yield an adherent electrical insulating film of average thickness of 1 mil. The coated wire tested after 48 hours aging at room temperature had a "hot-scrape" resistance of 26 ounces and tended to crack on the 13 smallest turns of the spiral in the "heat-shock" test. After aging for 48 hours at 125° C., the "hot-scrape" resistance increased to 40 ounces and the "heat-shock" test exhibited the same amount of cracking as the wire aged at room temperature.

*Example 38*

Eight hundred seventy-four (874) parts of polyester resin A, 510 parts of the nickel carbonate complex of Example 6, 88 parts of the oil-soluble phenolic resin as before were mixed together and diluted with wire enamel solvent and 100 parts of mixed cresols (to obtain clarity) to a non-volatile content of 28%. The clear varnish solution was dip-coated and baked at 720° F. on No. 17 gauge wire, producing a tough electrical insulating film having a "hot-scrape" resistance of 27 ounces after aging 24 hours at room temperature. Samples of the wire aged for 48 hours at 125° C. had a "hot-scrape" value of 37-40 ounces. Both the room temperature and heat aged wire samples were resistant to immersion in boiling water for 60 minutes, and to refluxing ethanol-toluol mixtures for 10 minutes.

*Example 39*

A polyester wire coating material containing a cobalt acetate complex was prepared by mixing together 874 parts of the polyester resin A, 510 parts of the cobalt acetate complex of Example 9 and 88 parts of the heat-reactive, oil-soluble phenolic resin as before with 120 parts mixed cresols and enough wire enamel solvent to dilute the mixture to a clear varnish with a 29% non-volatile content. The varnish was applied to No. 17 gauge wire in four coats, each being baked for 40-60 seconds at 700° F. to yield a heat-converted adherent film of an average thickness of 1 mil. Samples of the coated wire aged 24 hours at room temperature had a "hot-scrape" resistance of 40-42 ounces and when given the "heat-shock" test only 5-9 of the smallest turns showed some cracking of the coating. Samples of the coated wire aged for 48 hours at 125° C. had a "hot-scrape" resistance of 50-52 ounces and exhibited about the same amount of cracking in the "heat-shock" test as the samples aged at room temperature. Both samples were resistant to boiling water for 60 minutes as well as immersion in refluxing ethanol-toluene mixtures for 10 minutes.

*Example 40*

Eight hundred seventy-four (874) parts of polyester resin A, 640 parts of the lead oxide complex described in Example 11, 88 parts of the heat-reactive, oil-soluble phenolic as before were mixed together with sufficient wire enamel solvent to form a varnish of 28% non-volatile content. The diluted varnish had a clear amber color. Applied to No. 17 gauge wire as a dip-coating and baked at 690° F. for 40-60 seconds, an adherent 1 mil thick film was obtained which passed the "heat-shock" test without cracking except on 2-3 of the smallest turns, both before and after the coated wire was aged 48 hours at 125° C. "Hot-scrape" resistance of both samples was about 22 ounces. The coating was also resistant to boiling water and refluxing ethanol-toluene mixtures, and in addition was more resistant to aqueous sulphuric acid than coatings prepared from other metal complexes based on alkylene polyamines as the nitrogen reactant.

*Example 41*

A heat-convertible varnish was made by mixing together 550 parts of the zinc oxide complex prepared with urea and mixed cresols, as described in Example 14, 1092 parts of the polyester resin A and 110 parts of the heat-reactive, oil-soluble resin as before. The mixture was diluted to a wire-coating consistency by admixture of sufficient wire enamel solvent to reduce the non-volatile content to 28%. The diluted varnish had a clear amber color and when applied as a four-coat system on No. 17 gauge copper wire, each coat being baked for 40-60 seconds at 700° F., a clear amber colored 1 mil thick film was obtained on the wire having excellent flexibility and toughness. Samples of the coated wire tested after being aged 24 hours at room temperature had a "hot-scrape" value of 50-52 ounces, and exhibited only one crack on the second smallest turn of the spiral in the "heat-shock" test. Aging the coated wire for 24 hours at 125° C. and then retesting caused a slight increase in the "hot-scrape" value, e. g., 52-55 ounces, and only a few more cracks in the "heat-shock" test. The coatings were also resistant to boiling water, and mixed refluxing solvents such as toluol and ethanol.

*Example 42*

The stabilizing effect of a zinc oxide complex prepared with p-phenyl phenol as described in Example 19 was determined by mixing together 800 parts of the complex, 1069 parts of polyester resin A, and 108 parts of the oil-soluble, heat-reactive phenolic resin with 108 parts commercial wire enamel solvent, and 208 parts mixed cresols resulting in a clear viscous solution that could be further diluted with the wire enamel solvent to a non-volatile content of 30% without precipitation of any of the ingredients. The diluted varnish was used as a dip-coating for No. 17 gauge copper wire, four coats being applied successively and each being baked for 40-60 seconds at 680° F. The coated wire was tested for flexibility and adherence of the baked coating, and showed a "hot-scrape" resistance of 35-38 ounces when tested after 24 hours aging at room temperature, and of 47-50 ounces after exposure for 48 hours at a temperature of 125° C. Both the room temperature aged sample and the 125° C. aged sample passed the "heat-shock" test, the latter having cracks on the 2-3 of the smallest turns of the spiral.

*Example 43*

A wire enamel composition containing polyester resin D was made by dissolving 66 parts of oil-soluble heat-reactive phenol-aldehyde resin as described in Example 33 in 398 parts of a commercial wire enamel solvent containing a mixture of aromatic hydrocarbons. To this solution there were added 660 parts of polyester resin D and 386 parts of the zinc oxide complex described in Example 20 and mixed together to form a homogeneous varnish having a Gardner-Holdt viscosity of Z-4 at 25° C. and a non-volatile content of 53%. The varnish was then diluted with more of the same wire enamel solvent to a non-volatile content of 26% to facilitate coating of wire. The diluted varnish was applied to No. 17 copper wire and baked in the manner described in Example 33; four coats were successively applied and baked yielding a one mil thick film on the wire. The coated wire had an average "hot-scrape" resistance of 21-22 ounces. In the tapered mandrel "heat shock" test, cracking of the coating was observed only on the first five small diameter turns. The wire when immersed for 60 minutes in boiling water retained its hardness and was resistant to peeling by the finger nail. When submerged for 24 hours in 5 percent aqueous sulphuric acid at room temperature, the coating was unaffected, whereas the coating of Example 33, made with a polyester resin based on an ether type glycol, was seriously affected after only a 30 minute immersion.

*Example 44*

A wire enamel composition containing polyester resin E was made by dissolving 15 parts of oil-soluble phenol aldehyde resin as previously described in Example 33 in 91 parts commercial wire enamel solvent. To this solution there were added 150 parts of polyester resin E and 88 parts of the zinc oxide complex described in Example 20 and mixed together to form a homogeneous solution having a Gardner-Holdt viscosity of Z and a non-volatile content of 51%. This solution was diluted to a 20% non-volatile content with the same wire enamel solvent. Four coatings were applied to No. 17 copper wire and baked as described in Example 33. The coated wire had average "hot-scrape" resistance of 27 ounces. In the "heat shock" test, the coating cracked on only the first three small turns. The coating was not affected by immersion for 24 hours in 5% aqueous sulphuric acid at room temperature.

*Example 45*

A wire enamel containing a complex with ammonia as the nitrogen compound was prepared by mixing together 1923 parts of the zinc oxide-phenol-ammonia complex described in Example 29, 908 parts of the oil-soluble phenol-formaldehyde resin as previously described in Example 33 dissolved in an equal amount of xylol, 384 parts of mixed cresols, 4515 parts of polyester resin A and 2270 parts of commercial wire enamel solvent. A slightly hazy, dark amber solution was obtained having a Gardner-Holdt viscosity of W and a non-volatile content of 51%. When this solution was diluted with the same solvent to a 27% non-volatile content for wire coating purposes, it was clear and free from haze. No. 17 gauge copper wire was coated with the diluted solution and baked as described in Example 33. The coated wire had excellent "heat shock" resistance upon testing it after aging 24 hours at room temperature and also after 48 hours aging at 125° C. Its "hot-scrape" resistance after aging 48 hours at 125° C. was an average of 30 ounces. The coating had superior resistance to dilute acids than the coating described in Example 33, in that after 24 hours immersion in 5% aqueous sulphuric acid, the coating while somewhat softer than before the test was nevertheless obviously tougher than that of Example 33. The best acid resistance thus far observed, however, occurred with the polyester resins made exclusively with the higher glycols which are free from ether groups and having four or more carbon atoms in the aliphatic chain. Such glycols are exemplified by butanediol-1,3; pentanediol-2,4; 2-methylpentanediol-2,4; 2-ethylhexanediol-1,3 and 1,10-decanediol.

Although only one specific heat-hardenable oil-soluble phenolic resin was shown in the previous examples, other species of these phenolic resins have been tried, and found to have a similar effect in improving the hardness, adhesion and water resistance of the polyester resin. For instance, substituting in Example 33 an equivalent quantity of an oil-soluble, heat-reactive resin based on a reaction product of formaldehyde with p-phenyl phenol and p-tertiary butyl phenol, yielded a baked coating having a "hot-scrape" resistance of 33-34 ounces for a coating aged 24 hours at room temperature and of 42-43 ounces for a sample aged 48 hours at 125° C. Again in substituting for the phenolic resin of Example 33, an oil-soluble, heat-reactive resin prepared from formaldehyde and tar acids (a commercial mixture of cresols, xylenols, and minor amount of phenol and alkyl phenols) a wire coating was obtained having a "hot-scrape" resistance of 43-45 ounces for samples aged 24 hours at room temperature and of 58-60 ounces for samples aged 48 hours at 125° C.

Substituting a non-heat-reactive, oil-soluble phenol aldehyde resin, however, for the phenolic resin of Example 33, yielded heat-hardenable coatings having fair "hot-scrape" resistance of about 38 ounces for a room temperature aged sample, but having more cracks when subjected to the "heat-shock" test, there being cracks as far as the ninth turn on the spiral.

Heat-reactive phenol-aldehyde resins as well as ketone-aldehyde resins which are not oil-soluble can also be used as satisfactory modifying ingredients but tend to yield heat-converted products having less flexibility than the oil-soluble phenol-aldehyde resins.

The amount of oil-soluble heat-reactive resin which can be incorporated is almost unlimited as respects compatibility but in amounts up to 20% on the weight of the polyester resin the best results are obtained; above this amount the inherent brittleness of most phenolic resins becomes increasingly evident in the heat-converted coating composition especially in wire coatings subjected to very sharp bends as by wrapping the wire around its own diameter.

The compatibility of many of the metal complexes and the polyester resins is apparently infinite, although the mixture when diluted with solvents may exhibit some precipitation especially in the presence of monohydric alcohols, and glycol ethers; such dispersions may be clarified by the addition of stronger solvents such as aromatic hydrocarbons particularly benzol, toluol, xylol and phenols. The amount of phenol-soluble metal complex required for heat-stabilization of the polyester resins is usually a small amount and may be as little as one per cent calculated as free metal in the complex and as high as ten per cent. Amounts higher than ten per cent as with excessive amounts of the oil-soluble phenolic resins tend to promote excessive brittleness of the coating.

The heat-convertible polyester resins containing the phenol-soluble metal complex can be further modified by the addition of compatible non-heat-convertible polyester resins such as the condensation products of dihydric alcohols and saturated dicarboxylic acids, for instance, succinic, adipic, suberic, sebacic and the like, these resins having insufficient functional groups for cross-linking; such non-heat-convertible polyester resins tend to plasticize the heat-convertible polyester resin increasing their flexibility in the heat-converted state. These heat-convertible polyester resins can also be prepared by the co-esterification of unsaturated dicarboxylic acids and saturated dicarboxylic acids with dihydric alcohols. The mixture of the two acids being such proportion that the resin is heat-convertible.

This application is a continuation-in-part of our co-pending application Serial No. 650,762, filed February 27, 1946.

What is claimed is:

1. A phenol-soluble complex in a viscous to resinous solid form being the co-reaction product resulting from heating to clarity a reaction mass consisting of (1) a compound of a polyvalent drier metal selected from the group consisting of the salts, oxides and hydroxides of zinc, cadmium, lead, cobalt, manganese, vanadium, and nickel, (2) a phenol in an amount providing at least about there phenolic hydroxyl groups per metal atom of the metal compound, said phenol being selected from the group consisting of phenols in which the phenolic hydroxyl is the sole reactive group in the molecule and phenols containing in addition to the phenolic hydroxyl group a carboxyl group attached to the ring and (3) a nitrogen compound selected from the group consisting of ammonia, ammonium hydroxide, urea, and alkylene polyamides free of reactive groups other than $NH_2$ and NH, said nitrogen compound being present in an amount providing per metal atom of the metal compound at least about three $NH_2$ groups when the nitrogen compound is urea or an alkylene polyamine, at least about three molecules when the nitrogen compound is ammonia, and at least about five molecules when the nitrogen compound is ammonium hydroxide.

2. A phenol-soluble complex as defined in claim 1 wherein the drier metal is lead.

3. A phenol-soluble complex as defined in claim 1 wherein the drier metal is zinc.

4. A phenol-soluble complex as defined in claim 1 wherein the drier metal is cadmium.

5. A resinous phenol-soluble complex being the co-reaction product resulting from heating to clarity a reaction mass consisting of (1) a compound of a polyvalent drier metal selected from the group consisting of the salts, oxides and hydroxides of zinc, cadmium, lead, cobalt, manganese, vanadium, and nickel, (2) a phenol in an amount providing at least three phenolic hydroxyl groups per metal atom of the metal compound, said phenol being selected from the group consisting of phenols in which the phenolic hydroxyl is the sole reactive group in the molecule and phenols containing in addition to the phenolic hydroxyl group a carboxyl group attached to the ring and (3) a nitrogen compound selected from the group consisting of ammonia, ammonium hydroxide, urea, and alkylene polyamines free of reactive groups other than $NH_2$ and NH, said nitrogen compound being present in an amount providing per metal atom of the metal compound at least about three $NH_2$ groups when the nitrogen compound is urea or an alkylene polyamine, at least about three molecules when the nitrogen compound is ammonia, and at least about five molecules when the nitrogen compound is ammonium hydroxide, said co-reaction product having been heated up to about 200° C., to remove uncombined and loosely held phenol and nitrogen compound.

6. A phenol-soluble complex in a viscous to resinous solid form being the co-reaction product resulting from heating to clarity a reaction mass consisting of (1) zinc oxide, (2) a monohydroxy phenol in amount providing at least about three hydroxyl groups per zinc atom, said phenol being selected from the group consisting of phenols in which the phenolic hydroxyl is the sole reactive group in the molecule and phenols containing in addition to the phenolic hydroxyl group a carboxyl group attached to the ring and (3) an alkylene polyamine free from reactive groups other than $NH_2$ and NH and in amount providing at least about three $NH_2$ groups per zinc atom.

7. A wire coating composition comprising a dispersion in a volatile solvent of (1) a heat-convertible polyester resin comprising the resinous reaction product of an ethylenically unsaturated dicarboxylic acid and a dihydric alcohol, (2) a phenol-soluble complex compound as defined in claim 2 between one and ten percent by weight of the polyester resin calculated as free metal in the complex and (3) an oil-soluble, heat-reactive phenol-aldehyde resin in amount up to 20% by weight of the polyester resin, said coating composition when heat-converted on a wire surface being characterized by flexibility and adherence on being subjected to heat and stress.

8. A heat-convertible polyester resin comprising the resinous reaction product of an ethylenically unsaturated dicarboxylic acid and a dihydric alcohol in admixture with a phenol-soluble complex compound as defined in claim 2, in amount calculated as free metal equivalent to between one and ten percent by weight of the polyester resin.

9. A heat-convertible polyester resin comprising the resinous reaction product of an ethylenically unsaturated dicarboxylic acid and a dihydric alcohol in admixture with a phenol-soluble complex as defined in claim 6, in amount calculated as free metal equivalent to between one and ten per cent by weight of the polyester resin.

10. A heat-convertible polyester resin comprising the resinous reaction product of an ethylenically unsaturated dicarboxylic acid and a dihydric alcohol in admixture with a phenol-soluble complex compound as defined in claim 1 wherein the drier metal is cadmium, in amount calculated as free metal equivalent to between one and ten per cent by weight of the polyester resin.

11. A heat-convertible polyester resin comprising the resinous reaction product of an ethylenically unsaturated dicarboxylic acid and a dihydric alcohol in admixture with a phenol-soluble complex compound as defined in claim 1 wherein the drier metal is lead, in amount calculated as free metal equivalent to between one and ten per cent by weight of the polyester resin.

12. A coating composition comprising a dispersion in a volatile solvent of a resinous polyester reaction product of a dihydric alcohol and the adduct of maleic anhydride and cyclopentadiene, an oil-soluble phenol-aldehyde resin in amount up to 20 per cent by weight of the polyester resin, and a phenol soluble complex compound as defined in claim 1, in amount calculated as free metal equivalent to between one and ten per cent by weight of the polyester resin.

13. A heat-convertible resinous polyester composition comprising the ester reaction product of an ethyenically unsaturated dicarboxylic acid and a glycol of at least four carbon atoms in the aliphatic chain and free from ether groups in admixture with a phenol soluble complex as defined by claim 1 in amount calculated as free metal therein equivalent to between one and ten per cent by weight of the polyester resin, said composition in the heat-converted state.

14. Wire coated with an infusible polyester resin comprising the resinous reaction product of an ethylenically unsaturated dicarboxylic acid and a dihydric alcohol modified with an oil-soluble phenol-aldehyde resin in amount up to 20% by weight of the polyester resin and a phenol-soluble complex compound as defined in claim 1, in amount calculated as free metal equivalent to between one and ten per cent by weight of the polyester resin.

15. Wire coated with an infusible polyester resin comprising the resinous reaction product of an ethylenically unsaturated dicarboxylic acid and a dihydric alcohol modified with a phenol-soluble complex drier metal compound as defined in claim 1, in amount calculated as free metal equivalent to between one and ten per cent by weight of the polyester resin.

HAROLD F. WAKEFIELD.
SIDNEY J. SCHULTZ.
STANLEY H. RICHARDSON.

REFERENCES CITED

The following references are of record in the file of this patent:

UNITED STATES PATENTS

| Number | Name | Date |
|---|---|---|
| 1,933,520 | Bruson | Oct. 31, 1933 |
| 2,075,230 | Schatz | Mar. 30, 1937 |
| 2,150,349 | Van Peski et al. | Mar. 14, 1939 |
| 2,480,823 | Morris et al. | Sept. 6, 1949 |

FOREIGN PATENTS

| Number | Country | Date |
|---|---|---|
| 512,452 | Great Britain | Sept. 15, 1939 |
| 538,453 | Germany | Nov. 13, 1931 |

OTHER REFERENCES

Hoffmann: Berichte, vol. 24, pp. 3741–3746.

Weinland: Zeit. Anorg. Chem., vol. 126 (1922), pp. 141–145, 149–151, 161, 162.

Hoffmann: Berichte, vol. 36 (1903), pp. 1149–1151.

Garreau: Comptes Rendus, vol. 208 (1939), pp. 1158–1160.

Ripan et al.: Ann. Sci. Univ. Jassy I, 29, 51–66 (1943), abstracted in Chem. Abstr., vol. 42, p. 3746.